United States Patent [19]

von Bogdandy et al.

[11] 4,304,598

[45] Dec. 8, 1981

[54] METHOD FOR PRODUCING STEEL FROM SOLID, IRON CONTAINING PIECES

[75] Inventors: Ludwig von Bogdandy, Oberhausen; Karl Brotzmann, Sulzback-Rosenberg, both of Fed. Rep. of Germany

[73] Assignee: Klockner-Werke AG, Fed. Rep. of Germany

[21] Appl. No.: 188,860

[22] Filed: Sep. 19, 1980

[51] Int. Cl.³ .............................................. C21C 5/34
[52] U.S. Cl. ........................................... 75/60; 75/59
[58] Field of Search .................. 75/60, 48, 46, 40, 31, 75/59

[56] References Cited

U.S. PATENT DOCUMENTS 3,499,755 3/1970 Morris ...................................... 75/48
4,089,677 5/1978 Spenceley .............................. 75/60

Primary Examiner—P. D. Rosenberg
Attorney, Agent, or Firm—Watson, Cole, Grindle & Watson

[57] ABSTRACT

A procedure is provided for producing steel from solid, iron containing pieces such as scrap iron, solid pig iron, iron pellets, iron sponge and the like. The iron containing pieces are smelted in a blown oxygen converter equipped with submerged injection devices for oxygen and pulverized fuel. The pieces are first introduced into the converter and preheated and then they are contacted with a sufficient quantity of molten steel to substantially reduce the length of the smelting period and thereby conserve fuel. The molten steel used in the contacting step is recycled from the previous batch after having been retained for the meanwhile in a separate auxiliary ladle.

15 Claims, 2 Drawing Figures

METHOD FOR PRODUCING STEEL FROM SOLID, IRON CONTAINING PIECES

BACKGROUND OF THE INVENTION

1. Field of the Invention

The present invention relates to the production of steel from solid iron containing metallic pieces such as scrap iron, solid pig iron, iron pellets, iron sponge and the like in a blown oxygen converter which is equipped with submerged injection jets for both oxygen and pulverized fuels containing carbon.

2. Description of the Prior Art

At the present time, the production of steel from scrap iron without the addition of liquid crude iron is preferably carried out in electric-arc furnaces. By the profitability of such a process depends largely upon the price of electric energy. The known converter procedures, wherein oxygen is blown onto or through the fused mass, work quicker and more efficiently, as far as cost is concerned, then the electric-arc furnaces. But in these latter processes, liquid crude iron is generally required for the production of steel in the converter, with scrap iron being added as a cooling medium, in relationship to its composition, in the refining process. Usually, the proportion of scrap iron in relation to the weight of steel amounts to approximately 30%.

More recently converter procedures have been proposed which make it possible to increase the proportion of scrap iron such that steel may be produced entirely from solid iron containing pieces such as scrap iron. To do this, the required heat is introduced by preheating and melting the scrap iron and then feeding fuels containing carbon into the fused mass. In such processes, the profitability is essentially determined by the pyrometric efficiency of the fuels that are used.

In the old German Pat. Nos. 508,966 and 537,781 of 1924 and 1929 respectively, a converter procedure for smelting ore is described wherein coal dust and oxygen, or oxygen-enriched air, are introduced into the fused mass. The introduction of such fuels and the conveying of the required heat to the fused mass obviously was difficult, for it was subsequently proposed, in supplementary German Pat. No. 537,781, that the procedure of German Pat. No. 508,966 should be conducted in an electrically heated converter.

German Pat. No. 28 38 983, entitled "Procedure for Delivering Heat in the Production of Steel in a Converter", describes a method of operation whereby the scrap iron charge to the converter may be increased at will to finally produce a fused mass of steel made entirely from solid iron containing pieces. According to the procedure of this publication, the converter is charged with scrap iron which is then preheated for approximately 10 minutes. During the preheating phase, oxygen injection jets located in the bottom of the converter work as burners. After the preheating step, liquid crude iron may be charged into the converter or the burners may continue to work without the addition of crude iron. As soon as the contents of the converter are completely melted to present a fused mass, a pulverized carbon containing fuel, such as coke or coke powder, and oxygen surrounded by a hydrocarbon containing protective medium are blown through submerged jets located beneath the surface of the molten mass. Approximately the same amount of oxygen as is introduced under the surface of the mass is blown simultaneously onto the upper surface of the mass through the open converter space.

In the practical application of the foregoing procedure, it has become evident that as the proportion of crude iron charged in relation to the final weight of steel produced is reduced until solid iron containing pieces are used exclusively, the smelting time is extended out of all proportion and the overall length of the time of the process is correspondingly increased. Furthermore, the consumption of energy is variable during this smelting phase, and increases a bit, on the average. Consequently, without using liquid crude iron this procedure cannot be carried out as reliably or as profitably as can be done when using a minimum quantity of a crude-iron fused mass. A lengthened time of operation can be expected and fluctuations in the pyrometric efficiency of the fuel being used will occur during the scrap iron smelting period.

SUMMARY OF THE INVENTION

One of the principal objects of the present invention is thus to provide a procedure for producing steel whereby it is possible to produce steel entirely from solid iron containing pieces without the necessity for using liquid crude iron and yet with a high degree of energy efficiency (that is, with an energy consumption equivalent to that encountered when a minimum quantity of liquid crude iron is used), in a relatively short overall operational period, and consequently in a more profitable manner than before.

The foregoing is accomplished through the use of the process of the present invention for producing steel from solid, iron containing metallic pieces in a blown oxygen converter equipped with submerged injection devices for oxygen and pulverized fuel. The method comprises the steps of introducing a charge of solid, iron containing metallic pieces into the converter; preheating the charge; contacting the preheated charge in the converter with a quantity of molten steel to produce a total batch; smelting the batch for a sufficient period of time to fuse the entire batch and convert the same into a steel product; tapping a first portion of the steel product from the converter for further processing; tapping a second portion of the steel product from the converter and retaining the same separately from the converter; and subsequently reintroducing the retained second portion of steel product into the converter and using the same as the quantity of molten steel during the contacting step, the second portion and therefore the quantity of molten steel being of sufficient size to substantially reduce the length of the smelting time period.

In accordance with the present invention, the size of the second tapped portion preferably will be from 10 to 30% of the size of the first tapped portion, that is from 10 to 30% more steel will be produced in the converter than is desired for further processing. After that desired amount of steel has been tapped, the remaining steel is tapped into a separate receptacle such as a suitable auxiliary steel transfer ladle for retention and subsequent recycling.

The portion of steel to be recycled may be recarburized prior to reintroduction into the converter and it may be desirable, in accordance with the invention, to remove slag and/or to add a deoxidizer such as silicon to suppress the undesirable reactions between the slag and the decarbonized steel.

DETAILED DESCRIPTION OF THE INVENTION

Figure 1:
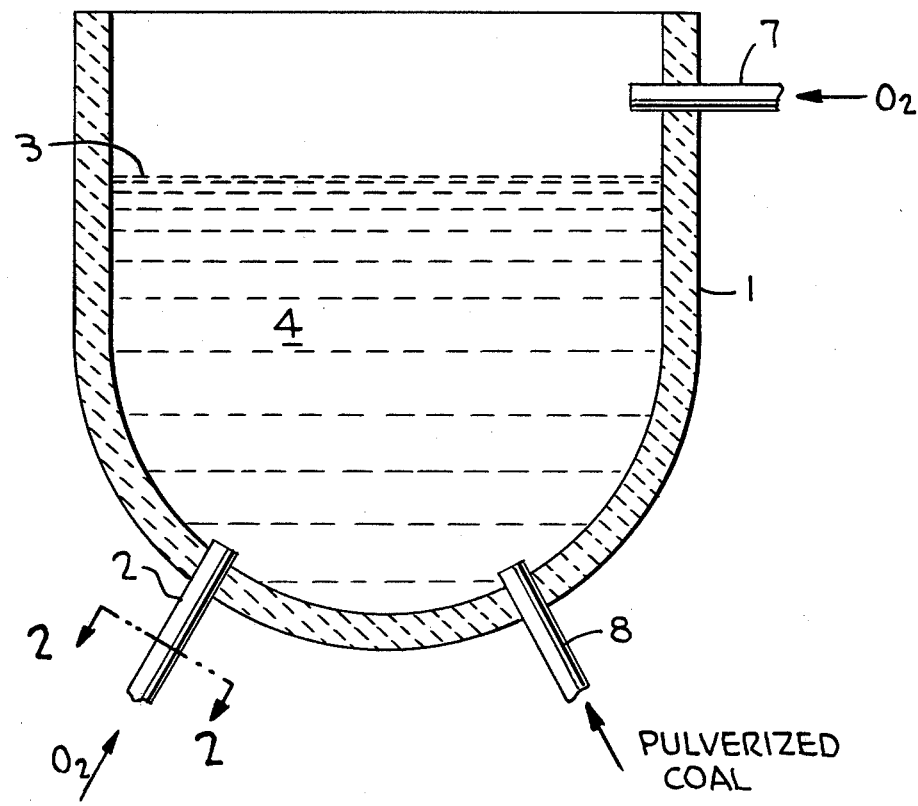
FIG. 1 is a schematic view of a blown oxygen converter useful in connection with the present invention.
Figure 2:
FIG. 2 is a cross-sectional view of the oxygen injection jet of the converter taken along line II—II of FIG. 1.

The procedure of the invention is preferably carried out in an improved blown oxygen converter as described in German Pat. No. P 28 38 983 and illustrated schematically in FIG. 1 of the drawing. In FIG. 1, the converter 1 has oxygen injection jets 2 under the surface 3 of the steel bath 4 which serve the purpose of conducting an oxidizing gas, that preferably is oxygen itself, into the molten mass in the converter. The jets may be configured, as shown in FIG. 2, in the form of an inner nozzle 5 and in outer annular nozzle 6 whereby the oxygen flowing from nozzle 5 and into the fused mass is surrounded by a hydrocarbon gas flowing from nozzle 6 to thereby protect the jets 2. At the same time, converter 1 is preferably equipped with jets 7 for injecting oxygen onto surface 3 of bath 4. The devices 7 for blowing oxygen onto surface 3 may be jets disposed in the fireproof masonry in the upper area of the converter, or they may be the familiar water-cooled lances. Between 20 and 80% of the total amount of oxygen is conducted to the refining process from above surface 3 through one or more gas jets 7 directed at the surface of the bath which work through a considerable portion of the refining process like free jets blowing in a gas chamber, in conformity with German Pat. No. 27 55 165. Furthermore, converter 1 also is equipped with submerged injection jets for injecting carbon containing fuels into molten mass 4 beneath the surface 3 thereof. Those jets may be operated in a known manner, in conformity with the procedure described in German patent application No. P 29 34 333.7, which has not yet been published. Coke, carbonized lignite, graphite and coal of various qualities and in various mixtures may advantageously be used.

The solid, iron containing metallic pieces which are used, and particularly pieces of scrap iron, solid pig iron, pellets, iron sponge or any desired mixtures of the same, are first charged into converter 1 and are preheated. During this preheating phase, the jets 2 under the surface of the steel bath may be operated as burners, in conformity with German Pat. No. P 28 16 543.7. Liquid and/or gaseous hydrocarbons, and preferably natural gas or petroleum may be used as fuels.

Surprisingly, it has been found that the smelting time and the pyrometric efficiency of the fuels used for smelting the scrap iron remain approximately constant even when the amount of the solid iron is increased up to a proportion of approximately 30% of the fused mass in a 30-ton converter, up to a proportion of approximately 20% of the mass in a 60-ton converter and up to a proportion of approximately 10% of the fused mass in a 200-ton converter. When the charge consists of 100% solid pieces of scrap iron, for example, the smelting time (that is, the time after preheating until the fused mass becomes present in the area of the jets in the sump at the bottom of the converter) is unexpectedly prolonged and the consumption of fuel fluctuates relatively sharply during that period. The fuel consumption also is greater, on the average, than when comparable smeltings are carried out using a partially liquified charge. Perhaps an explanation for this prolongation of the smelting phase and the occasionally increased energy consumption when working without using liquids resides in the fact that the transition from preheated scrap iron to a liquid mass with sufficient volume wherein the fuels containing carbon may be dissolved and burned to CO while producing heat, takes place differently during this phase of the process as a result of the relatively sharply fluctuating operating conditions. The varying operating conditions are the result of, for example, the use of various kinds of scrap iron, differences in the packing of the pieces in the converter, the degree of oxidation achieved in preheating the pieces and the influence of these factors on heat transfer. Furthermore, variations during melting and the initial condition of the bath in the converter, particularly as relates to the converter tuyere arrangement, are to be expected.

In accordance with the preferred emodiment of the invention, from 10 to 30% more steel is produced in the converter than is needed for the tapping weight, that is, for further processing in the steel mill. For example, approximately 120 tons of steel are refined in a 100-ton converter and 100 of those 120 tons are to be tapped for further processing. The remaining 20 tons of steel are emptied into a storage receptacle, for example, an appropriate auxiliary steel ladle. The steel stored in the auxiliary ladle may then be recycled for use in the next smelting step after the scrap iron charge has been preheated.

It is important, both for the practical execution of the new procedure and for profitable operation, to completely remove the liquid steel intended for the next smelting step from the converter and to recycle it back to the converter after charging and preheating the subsequent charge of scrap iron. There are at least two major disadvantages that result from leaving the residual steel in the converter. If any substantial quantity of liquid steel remains in the converter, it will not be possible to preheat the scrap iron with burners located in the bottom of the converter. The required quantity of liquid steel must then be at least twice as much as in the case where the scrap iron is preheated. Furthermore, the charging of scrap iron into a fused mass of molten steel always present problems, particularly when the quantity of liquid is large, because the charging of the scrap iron is generally linked with mechanical manipulations of the converter. Moreover, undesirable reactions between the scrap iron and the liquid bath may occur.

It has also proved to be advantageous, when working in accordance with the invention, to recarburize the steel to be recycled. This should be done to establish a carbon content of greater than 1% in the steel and preferably a carbon content of between 2 and 3%. As a result of such recarburization, a cooling of the steel will occur. However, the solidification temperature of steel which is richer in carbon is also lowered correspondingly and thus the danger that a portion of the recycled steel will solidify when it comes into contact with the scrap iron in the converter is reduced. Finally, energy is obtained by injecting oxygen and combusting the same with the carbon contained in the molten steel. This contributes to a desirable, rapid heating of the material in the sump of the converter whereby the quantity of fused mass in the converter is quickly increased.

In order to obtain a pyrometric efficiency which is as favorable as possible in the preheating of the iron containing solid pieces (scrap iron) charged into the converter, an effort should be made to leave no residue of steel in the converter. However, when the molten steel is completely emptied from the converter, it is unavoidable that a portion of liquid slag will follow it. Undesirable reactions between this slag, which is rich in iron oxide, and the recarburized fused mass of steel can then take place in the auxiliary ladle. In accordance with another preferred aspect of the invention, therefor, a deoxidizer such as silicon is preferably added to the steel to be recycled. Such oxidizer should generally be included at concentrations of between 0.1 and 1.5%. The reactions between the slag and the steel residue may thus be substantially pressed.

It has proved to be especially profitable, when working in accordance with the invention, to add carbon in the form of coal to the liquid steel residue in the converter before it is emptied into the auxiliary ladle for storage and recycling. The recarburization thus takes place in a simple manner, being brought about by the injection of pulverized carbon containing fuels through injection jets present in the bottom of the converter.

Such recarburization of the steel residue in the converter is especially advantageous when steel is refined in conformity with the so-called two-slag practice. In the two-slag technique, slag is first removed as completely as possible after the main refining period. This first slag contains the essential portions of elements such as phosphorus and sulfur to be removed in the refining process. Then, during a so-called afterblowing or finishing-blowing process, a second quantity of slag is formed in the converter wherein the iron oxide content normally amounts to between 15 and 20%. If coal (or carbon) is later injected into the steel residue remaining in the converter to be recycled, the iron oxide content of the second slag, which is also still in the converter, is simultaneously reduced. As a result, the second slag becomes viscous or crumbly and may this be retained in the converter more easily when the steel residue is tapped into the auxiliary ladle for storage and recycling. This slag may be left in the converter as a lime containing substance for the next smelting operation. In this way, the consumption of lime may be reduced, and heating economics are simultaneously improved since there is less lime to heat. Furthermore, it has become apparent that this second slag, part of which is crumbly, improves the pyrometric efficiency during preheating when compared with a liquid slag. The reason for this is probably that liquid slag solidifies on the metallic charge more easily and impairs the heat transfer. Furthermore, as was mentioned above, it is difficult to completely empty the steel residue from the converter so long as slag is present in a highly fluid state. And such steel residue in the converter leads to a pronounced reduction of the pyrometric efficiency of the fuels used during preheating.

The principle thrust of the invention is thus to adapt its most essential feature, that is the recycling of a residual quantity of steel for use in smelting the next charge, to the operating conditions of various steel mills. In so doing, it will be appreciated by those skilled in the art that the quantity of steel recycled, the sequences in which substances are added and the amounts and characters of the alloying ingredients such as carbon and silicon, may be varied within broad limits while retaining the idea of the invention, which is, the production of steel without using liquid crude iron.

We claim:

1. A method for producing steel from solid, iron containing metallic pieces in a blown oxygen converter equipped with submerged injection devices for oxygen and pulverized fuel, said method comprising the steps of:
   introducing a charge of solid, iron containing metallic pieces into a said converter;
   preheating said charge;
   contacting said preheated charge in said converter with a quantity of molten steel to produce a batch;
   smelting said batch for a sufficient period of time to fuse the entire batch and convert the same into a steel product;
   tapping a first portion of said steel product from the converter for further processing;
   tapping a second portion of said steel product from the converter and retaining the same separately from said converter; and
   subsequently reintroducing said retained second portion of steel product into the converter and using the same as said quantity of molten steel during said contacting step, said second portion and therefore said quantity of molten steel being of sufficient size to substantially reduce the length of said smelting time period.

2. A method as set forth in claim 1 wherein the size of said second tapped portion of steel product is 10 to 30% of the size of said first tapped portion of steel product.

3. A method as set forth in claim 1 wherein said second portion of steel product is recarburized prior to the reintroduction thereof into the converter.

4. A method as set forth in claim 3 wherein said second portion is recarburized in the converter before the same has been tapped therefrom but after said first portion has been tapped for further processing.

5. A method as set forth in claim 1 wherein the bulk of the slag is removed from said converter prior to the tapping of said second portion.

6. A method as set forth in claim 3 wherein the bulk of the slag is removed from said converter prior to the tapping of said second portion.

7. A method as set forth in claim 4 wherein the bulk of the slag is removed from said converter prior to the tapping of said second portion.

8. A method as set forth in claim 3 wherein the deoxidizer content of said second portion is adjusted sufficiently to suppress undesirable reactions between slag and recarburized steel.

9. A method as set forth in claim 4 wherein the deoxidizer content of said second portion is adjusted sufficiently to suppress undesirable reaction between slag and recarburized steel.

10. A method as set forth in claim 6 wherein the deoxidizer content of said second portion is adjusted sufficiently to suppress undesirable reaction between slag and recarburized steel.

11. A method as set forth in claim 7 wherein the deoxidizer content of said second portion is adjusted sufficiently to suppress undesirable reaction between slag and recarburized steel.

12. A method as set forth in claim 8 wherein said deoxidizer is silicon and the content thereof is adjusted to between 0.1 and 1.5% of said second portion.

13. A method as set forth in claim 9 wherein said deoxidizer is silicon and the content thereof is adjusted to between 0.1 and 1.5% of said second portion.

14. A method as set forth in claim 10 wherein said deoxidizer is silicon and the content thereof is adjusted to between 0.1 and 1.5% of said second portion.

15. A method as set forth in claim 11 wherein said deoxidizer is silicon and the content thereof is adjusted to between 0.1 and 1.5% of said second portion.

* * * * *